United States Patent Office 3,551,264
Patented Dec. 29, 1970

3,551,264

FLUOROCARBON SOUND RECORD

Salvatore S. Mulay, Babylon, N.Y., assignor to Tri-Point Industries, Inc., a corporation of New York No Drawing. Original application Apr. 11, 1966, Ser. No. 542,430, now Patent No. 3,469,848, dated Sept. 30, 1969. Divided and this application June 24, 1969, Ser. No. 843,898
Int. Cl. B32b *27/06*
U.S. Cl. 161—42 10 Claims

ABSTRACT OF THE DISCLOSURE

A rigid phonograph disc record having upper and lower flat surfaces and wherein at least one of said surfaces is made substantially of polytetrafluoroethylene plastic. The disc record may have a laminated metal backing and a circular spiral grooved sound track recessed in the polytetrafluoroethylene plastic surface.

This is a division of application Ser. No. 542,430, filed Apr. 11, 1966, now Pat. No. 3,469,848, September 30, 1969.

This invention relates to sound records such as films, discs, or other bodies in whose surface sound tracks are directly produced or subsequently impressed, and relates more particularly to the use of a thermoplastic fluorocarbon resin from the group consisting of polytetrafluoroethylene, polychlorotrifluoroethylene, polyfluoroethylene-propylene, and polyvinylidenefluoride in the manufacture of such sound records.

Phonograph disc records are usually made by a lengthy process that includes the steps of cutting sound tracks in a plastic or nitrocellulose lacquer coated aluminum disc by means of a sound responsive recording stylus, followed by a succession of electroforming operations to produce metal masters, mothers, and stampers. Masters and stampers are negative reproductions of the original cut plastic record. Masters are made by electrodepositing a thin layer of metal on the surface of the original cut plastic record matrix, stripping the deposited metal from the matrix and backing it up for rigidity. By similar electroforming techniques, a mother is made from the master and serves as the matrix in electroforming the stamper. Stampers are used in dies for injection and compression molding of plastic records with impressed sound tracks.

Serious limitations found with nitrocellulose lacquer and the other plastics usually used to surface sound recording discs include: rapid degradation by the acids, alkalies, and other chemicals and solvents used in the electroforming process; permanent distortion of the sound track or cracking upon stripping away the electrodeposited metal; short life due to dimensional instability and high moisture absorption; and excessive background noise and echo heard when the reproducing stylus or needle rubs against the walls of the sound track on playback. In addition, the aluminum metal substrate often stains and corrodes. Costly rejects have developed in the record industry from the above mentioned deficiencies.

It has been found that replacing nitrocellulose and other plastic surfaced discs with this invention will achieve large cost savings. Tough and durable sound records having extraordinary sound fidelity and exceptional freedom from background noise and echo may now be mass produced by means of this invention. For example, a large number of stampers may now be directly electroformed from the same fluorocarbon plastic cutting, eliminating thereby, two costly intermediate electroforming operations formerly required to make masters and mothers. Rejects are reduced since the tough, flexible, scratch resistant, and non-stick properties of these fluorocarbon plastics facilitates stripping out the electrodeposited metal from the cut sound grooves in the original cutting. High dimensional stability and zero moisture absorption from the atmosphere permit the permanent storage of fluorocarbon plastic cuttings rather than expensive metal masters. Being inherently self-lubricating, sound tracks cut in these fluorocarbon plastic discs are remarkably smooth and free from burrs and ridges. Furthermore, the slippery surface of the sound track permits unlimited playback without wear, background noise, and echo that ordinarily causes loss of sound fidelity in other types of sound records.

Because these fluoroplastics possess unusually high heat resistance coupled with unsurpassed release properties, fluorocarbon plastic sound records cut in relief may be directly used in mold cavities for the injection and compression molding of sound tracks in fluorocarbon and other plastic sound records. This of course would obviate the need for and replace expensive metal stampers. In such applications, during the sound recording process, the recording stylus would be shaped and adapted to cut a sound track in the fluorocarbon plastic surface of the record that projects above the ground plane. A sound record of this configuration is also playable.

Accordingly, it is the object of the present invention to provide a sound recording disc that may be repeatedly used without deterioration as a matrix for directly electroforming metal stampers. Another object is to provide a sound record in which the playing surface at least is tough, flexible, dimensionally stable, non-hydroscopic and capable of reproducing sound with extraordinary fidelity and with exceptional freedom from background noise and echo. A further object is to provide a sound recording disc that may be repeatedly used in a simple economical method for making sound records of improved quality. A further object is to provide a sound record substantially free of the above mentioned deficiencies in heretofore known sound records. A further object is to provide a sound record with a sound track in relief. Further objects of the invention will presently appear as the description proceeds in connection with the appended claims.

The objects of the invention may be realized through the provision of a sound record in which at least the portion of the record in which the sound tracks are located, if not the whole record, is made from a fluorocarbon thermoplastic resin from the group consisting of polytetrafluoroethylene, polychlorotrifluoroethylene, polyfluoroethylenepropylene, and polyvinylidenefluoride. Interpolymers or mixtures of of polymers from this class of fluoroplastics may be used if desired. The resins may either be used alone or combined with plasticizers, fillers, coloring materials, softeners, and the like, depending upon the particular use and effect desired, as will be more fully understood by those skilled in the art to which this invention particularly appertains.

In a preferred construction according to this invention, a sound record is made in a platen press by laminating together under heat and pressure between two stainless steel platens, the following materials in the order given: polytetrafluoroethylene film 0.010″ thick; polyfluoroethylenepropyl film 0.002″ thick; and a stainless steel disc 0.030″ thick by 10″ diameter. To impart a highly polished finish to the polytetrafluoroethylene surface of the record, the contacting stainless steel planishing plate is finished to less than 8 microinches. During pressing, the upper and lower platens are held at a temperature of 310° F. and 15 tons of pressure is applied to the laminate for 5 minutes. Then the temperature of the platens is reduced to 100° F. while the pressure is increased to 20 tons for 3 minutes. Sound tracks may then be cut in the blank fluorocarbon plastic surfaced disc by means of a sound responsive recording stylus. The resulting sound record may be used as such and repeatedly replayed an unusually great number of times without loss of the original recorded fidelity; or as previously mentioned it may be used as a matrix for electro-forming masters. In a species of the invention, a soundless track is precut or impressed in the fluorocarbon blank for subsequent finish cutting by means of a sound responsive recording stylus. Sound tracks also are added to the fluorocarbon blank by softening and pressing with a master die. Sound records may be molded from polychlorotrifluoroethylene, polyfluoroethylenepropylene, and polyvinylidenefluoride by conventional injection, compression, and transfer molding procedures. Because of its high melt viscosity, polytetrafluoroethylene is molded by compacting powder at room temperature to the contour and size of the finished sound record using pressures from 2,000 to 10,000 pounds per square inch. The preform is then sintered at approximately 690° F.; or while still in the jel state, it may be transferred to a hot coining die and pressed to final dimensions while cooling. After sintering, the record can be quenched to obtain minimum crystallinity, or slow cooled to provide higher (and varying) levels of crystallinity.

It is not essential to the present invention that the above steps for making a fluorocarbon sound record be carried out exactly as given; for, a great many methods now employed in the molding of fluoroplastic materials may be utilized with equally good results. For example, the fluoroplastic surface may be applied to the substrate by means such as: lubricated molding of granular fluorocarbon resin; fluidized bed processing; and by dispersion coating. A final planishing press operation will provide the fluorocarbon plastic surface with the required finish of 2 to 8 microinches. One or two side sound records may be made by this invention.

The fluorocarbon materials to which the invention is applicable principally comprises the four tough fluoroplastics with extremely low coefficients of friction as mentioned above (polytetrafluoroethylene, polychlorotrifluoroethylene, polyfluoroethylenepropylene, and polyvinylidenefluoride). However, the invention is of especial use with polytetrafluoroethylene, since this material is particularly well suited to the manufacture of sound records that are essentially free from background noise and echo. It has the lowest coefficient of friction of any known plastic.

These fluoroplastics are paraffinic hydrocarbon polymers in which all or a substantial part of the hydrogen atoms have been replaced with fluorine atoms, and in one polymer a chlorine atom is part of the monomer structure. The forces binding the carbon and fluorine together provide one of the strongest known chemical linkages. The fluorine atoms are of such size that they form a tight protective cover over the chain of carbon atoms, not unlike a smooth impenetrable shield. Intermolecular forces are markedly lower and molecular chain lengths are much longer than in other plastics. As a result of the molecular arrangement of these fluoroplastics shearing occurs at the interface of mating materials rather than within their bulk; their coefficients of friction are unusually very low; they have inherent anti-stick qualities and good abrasion and wear resistance; they have remarkable vibration and accoustical dampening properties; and they have unusual thermal and chemical resistance. These characteristics make these fluorocarbon sound records superior in quality to any known today.

During recording, a sound track consisting of 200 grooves per inch is commonly cut in the plastic surface of the blank record. These grooves may be 0.003″ wide, 0.0015″ deep, and separated from each other by a 0.002″ wide land. The grooves in stereophonic records may be ½ mil wide and ¼ mil deep. Durable sound tracks are readily formed in these fluorcarbon plastics because of their toughness and degree of hardness. Never before has any other material used in the construction of sound records successfully combined the following characteristics now found in sound records made with these fluorocarbon plastics: groove walls with smooth, self-lubricating, anti-stick surfaces that eliminate background noise that would ordinarily occur when the playing stylus slides in the sound track during playback; tough, thin elastic walls between grooves that are free from brittleness and cold flow; high density and uniformity that suppresses mechanical vibration and echo between closely spaced grooves; good cutting qualities, the generation of a continuous chip by the cutting stylus with no horn ridging the land surface; and little resistance to the lateral motion of the cutting stylus thereby providing excellent frequency response.

Properties of the fluorocarbon plastics mentioned herein, such as toughness, hardness, abrasion resistance, and cutting qualities are related to their degree of crystallization. Percent crystallinity refers to the percent by weight of polymer chains fitted in a close packed arrangement. The degree of crystallinity is controlled by molecular weight and by the length of time during fabrication that the fluoroplastic is maintained within the temperature range for rapid crystallization. By rapidly cooling the fluorocarbon plastic through this critical temperature range during processing or annealing (example 585 to 620° F. for polytetrafluoroethylene) many small crystals result which render the plastic tough, transparent, and comparatively flexible and soft. On the other hand, slow cooling will promote the formation of larger crystals and crystal aggregates that render the fluoroplastic harder and more rigid. Practical crystallinity limits for polytetrafluoroethylene range from 46 to 70%.

For special purpose sound records, it may be necessary to modify the fluorocarbon materials mentioned herein by the addition of small quantities of other constituents. Material properties such as wear, creep resistance, stiffness, hardness, and dimensional stability may be increased substantially, while the coefficient of thermal expansion may be markedly decreased by the addition of small amounts of filler materials such as graphite, molybdenum disulfide, glass fiber, and ceramics. Other polymers and resins may be blended or mixed with the fluorocarbon resin to achieve certain desirable effects. For example, the addition of 5% by weight of molybdenum disulfide to polytetrafluoroethylene decreases the coefficient of thermal expansion without appreciably impairing the desirable frictional characteristics of the fluorocarbon.

In the manufacture of a fluorocarbon sound record, the bond strength between the polytetrafluoroethylene surface and the aluminum substrate may be improved by first etching the fluoroplastic. Polyethylene or some other suitable bonding agent may be used at the interface in place of the polyfluoroethylenepropylene. A stainless steel disc having superior resistance to the processing chemicals and greater rigidity in thin sections may be used as a substrate in place of aluminum. Stiff non-metallic materials such as epoxy-fiber glass laminate also may be used as a backing for the fluorocarbon plastic record surface; or for certain sound records the fluorocarbon plastic with an impressed sound track may be used with no backing.

From the above disclosure, it will be appreciated that any sound record consisting wholly or in part of a thermoplastic fluorocarbon resin from the group consisting of polytetrafluoroethylene, polychlorotrifluoroethylene, polyfluoroethylenepropylene, and polyvinylidenefluoride, or their homologues or derivatives with similar properties, with or without addition agents, fillers, colorants, and plasticizers, will come within the scope of this invention without sacrificing any of its advantages.

While the invention has been described in its preferred embodiments, many apparently widely different embodiments of this invention may be made without departing from the spirit and scope thereof, it is to be understood that the invention is not limited to the specific embodiments thereof except as defined in the appended claims.

I claim:

1. A rigid phonograph disc record having upper and lower flat surfaces and wherein at least one of said surfaces is made substantially of polytetrafluoroethylene plastic provided with a circular spiral grooved recessed sound track, and a rigid metal backing disc in contact with said polytetrafluoroethylene plastic.

2. The rigid phonograph record as described in claim 1 wherein said polytetrafluoroethylene plastic is in sheet form having a percent crystallinity of from about 46 to 70 percent and said metal backing disc is stainless steel.

3. A rigid phonograph record as defined in claim 1 wherein said polytetrafluoroethylene plastic contains from about 2 to 10 weight percent of a black filler selected from the group consisting of graphite and molybdenum disulphide.

4. The rigid phonograph disc record as described in claim 3 wherein said polytetrafluoroethylene plastic is further provided with from about 2 to 10 weight percent of molybdenum disulphide filler and said recessed sound track comprises a flat spiral of about 200 to 250 grooves per inch with said grooves having a cross section of about ¼ to 3 thousandth of an inch wide at the top and about ¼ to 2 thousandth of an inch deep, and having a land width between successive grooves of about 1½ to 5 thousandths of an inch.

5. A rigid laminated phonograph disc record blank for receiving a recessed circular spiral sound track comprising a surface sheet of polytetrafluoroethylene plastic and a rigid metal substrate sheet bonded to the underside of said polytetrafluoroethylene plastic surface sheet.

6. A rigid laminated phonograph disc record blank as defined in claim 5 wherein, said polytetrafluoroethylene plastic is further provided with a plasticizer, and said metal substrate sheet is stainless steel.

7. A rigid laminated phonograph disc record blank as defined in claim 5 wherein said polytetrafluoroethylene plastic is further provided with from about 2 to 10 weight percent of a black filler selected from the group consisting of graphite and molybdenum disulphide.

8. A rigid flat laminated phonograph disc record blank for receiving a recessed circular sound track comprising a surface film of polytetrafluoroethylene plastic about 5 to 15 thousandths of an inch thick having a surface finish of about 2 to 8 microinches, a percent crystallinity of about 46 to 70, and an etched bottom surface; a stainless steel backing disc of about 20 to 40 thousandths of an inch thick bonded to said etched bottom surface; and a polyfluoroethylenepropylene plastic film about 1 to 3 thousandths of an inch thick interspaced between said polytetrafluoroethylene surface film and said stainless steel backing disc to effect a bond between said materials.

9. A rigid laminated phonograph disc record blank as described in claim 8 with said polytetrafluoroethylene plastic being further provided with about 2 to 10 weight percent of a black solid lubricant filling material selected from the group consisting of graphite and molybdenum disulphide.

10. A rigid laminated phonograph disc record blank as defined in claim 8 further provided with a circular spiral grooved sound track recessed in said polytetrafluoroethylene plastic surface film.

References Cited

UNITED STATES PATENTS

| | | | |
|---|---|---|---|
| 2,619,440 | 11/1952 | Lord | 161—42 |
| 2,606,851 | 8/1952 | O'Mahony et al. | 161—42X |

JOHN T. GOOLKASIAN, Primary Examiner

J. C. GIL, Assistant Examiner

U.S. Cl. X.R.

161—162, 165, 189; 260—41; 274—41